May 14, 1968
W. M. MACEK
3,382,759
RING LASER BIASED BY ZEEMAN FREQUENCY OFFSET
EFFECT FOR SENSING SLOW ROTATIONS
Filed Dec. 18, 1963
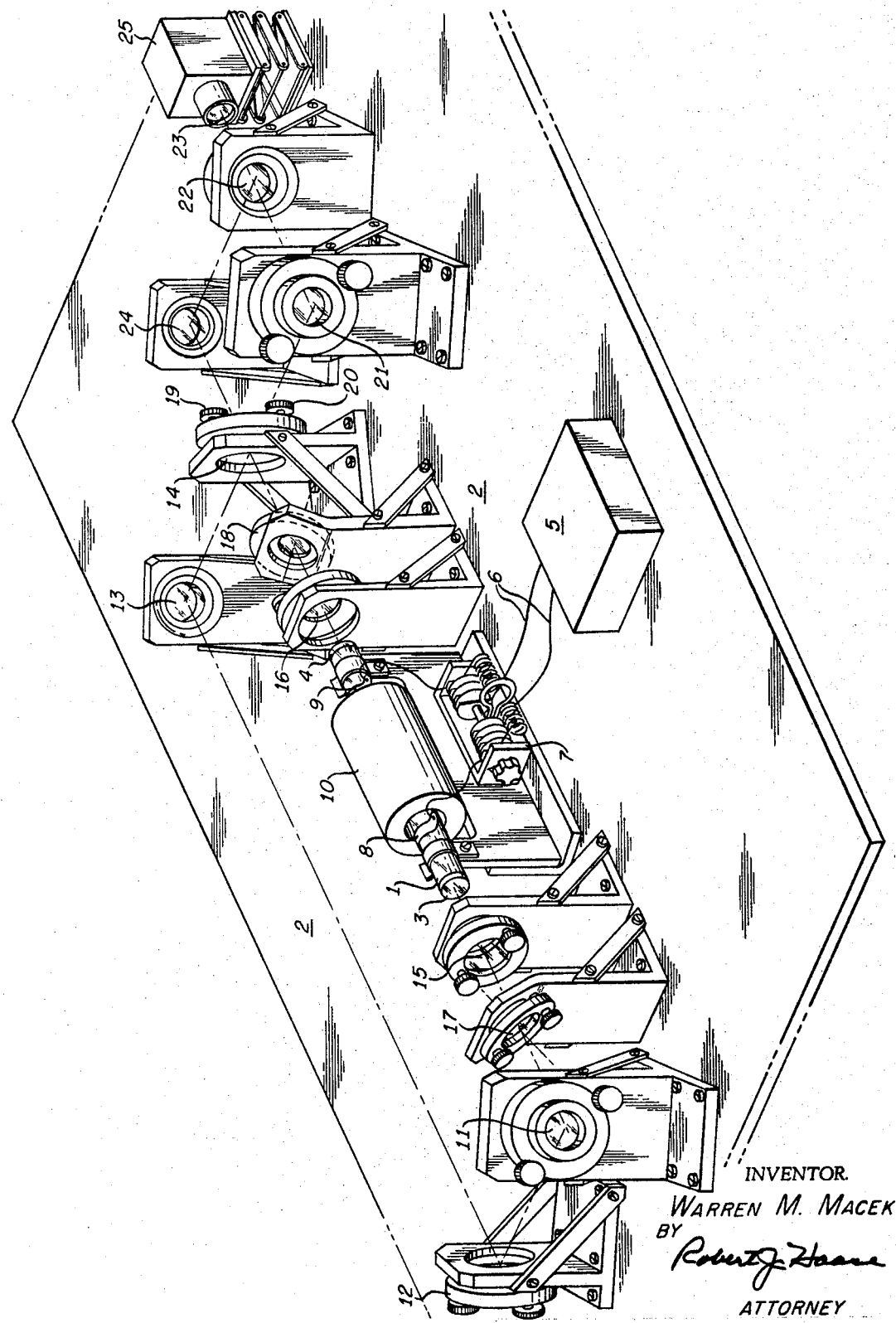
INVENTOR.
WARREN M. MACEK
BY
*Robert J. Haase*
ATTORNEY United States Patent Office 3,382,759
Patented May 14, 1968

3,382,759
RING LASER BIASED BY ZEEMAN FREQUENCY OFFSET EFFECT FOR SENSING SLOW ROTATIONS
Warren M. Macek, Huntington Station, N.Y., assignor to Sperry Rand Corporation, Great Neck, N.Y., a corporation of Delaware
Filed Dec. 18, 1963, Ser. No. 331,523
8 Claims. (Cl. 88—14)

The present invention generally relates to devices for the sensing of rotation with respect to an inertial frame of reference and, more particularly, to a travelling wave ring laser for sensing the direction and value of small rotational rates about an axis perpendicular to the plane of the ring.

Ring laser rotation sensors have been developed to perform the task of conventional mechanical devices such as, for example, a rate gyroscope, without the use of moving parts. Ring laser rotation sensors are patterned after the classical devices of G. Sagnac, A. A. Michaelson and G. H. Gale wherein the frequency shifts experienced by two beams of light travelling in opposite directions around a rotating closed loop path are used as a measure of the amount of path rotation. In the aforementioned classical devices, the two contrarotating beams of light were derived from incoherent light sources located external to the closed optical path. The result was relatively poor frequency shift discrimination. In the ring laser, however, the contrarotating beams are produced by a coherent light source (laser) positioned within and forming an integral part of the rotating closed loop optical path. The use of coherent light makes feasible the measurement of much smaller rotational rates using greatly reduced path lengths relative to the rotational rates and path lengths associated with the prior devices.

A ring laser rotation rate sensor is described in copending patent application Ser. No. 327,920, filed Dec. 4, 1963 in the name of Warren M. Macek and assigned to the present assignee. Briefly, the laser comprises a coherent light source located within a plane rectangular closed loop optical path. The source produces two beams of coherent light which travel in opposite directions around the aforesaid path. Each beam of light returns to its starting point in the path after the short but measurable interval of time required to traverse the loop at the finite velocity of light. If the light path is caused to rotate about an axis perpendicular to the plane of the path, a beam travelling in the same direction as the rotation would require a somewhat longer interval to return to its starting point. The effective path length travelled by the beam is lengthened by the distance that the starting point moves while the beam completes a traversal of the path. A beam of light, travelling in the direction opposite to the path rotation returns to its starting point in less time than if the path were not rotating because the effective path length of a complete traversal is shortened. The difference in the lengths traversed by the two beams and, hence, the difference in frequency between the two beams is related to the rotational rate of the closed loop path. By extracting the counter-rotating beams from the closed loop and heterodyning the extracted beams to produce a beat note, the rotational rate of the path can be determined.

The frequency of the beat note is directly related to the magnitude of the aforesaid rotational rates over a wide range of rates. It has been found, however, that a minimum finite rotational rate exists below which the frequency of the beat note suddenly reduces to zero. The phenomena of mode pulling, i.e., the abrupt frequency synchronization of the two oppositely travelling waves and the consequent loss of the beat signal below a critical rotational rate, precludes continuity of rotational measurement. Thus, very low rotations would escape detection unless a way were found of avoiding the phenomena of mode pulling so that the frequency of the beat note would decrease uniformly with decreasing rotational rates until zero rotational rate is reached. The ability of measuring small rotational rates around zero rate is particularly important in certain control systems such as platform stabilization systems.

It is the principal object of the present invention to provide a travelling wave ring laser for sensing low rotation rates about an axis perpendicular to the plane of the ring.

An additional object is to provide a ring laser exhibiting substantially no mode pulling effect.

Another object is to provide a ring laser characterized by minimum loss and requiring minimum excitation for sensing the rate and the direction of slow rotations.

These and other objects of the present invention as will appear from the reading of the following specification are achieved in a preferred embodiment by the provision of a continuous wave helium-neon gas laser tube positioned within one side of a plane rectangular closed loop optical path. Highly reflecting mirrors at each of the four corners of the rectangle direct the laser beams around the closed path. Means are provided to produce a steady magnetic field of predetermined value axially within the tube and along the optical path. Excitation energy is applied to the tube to produce a pair of oppositely sensed circularly polarized light beams at respective frequencies due to the Zeeman energy level splitting effect of the magnetic field on the excited laser medium. Both of the circularly polarized beams are emitted from each end of the gas tube.

One of the circularly polarized beams is selected to propagate around the closed path in one direction only. The other circularly polarized beam is selected to propagate exclusively in the other direction. This is accomplished with the aid of a pair of quarter-wave optical plates positioned about respective ends of the gas tube. Each plate converts the two oppositely sensed circularly polarized beams from a respective side of the gas tube into orthogonally oriented linearly polarized light beams. A polarizing plate is positioned adjacent each quarter wave plate to transmit a respective one of the linearly polarized beams to the exclusion of the other. The result is that a first linearly polarized beam having a first frequency is permitted to propagate around the closed optical path in one direction whereas a second linearly polarized beam having a second frequency is permitted to travel around the path in the opposite direction. The frequencies of the two counter-rotating linearly polarized beams are off set from each other by a fixed and known amount in the absence of ring laser rotation. Finite rotation in one sense about an axis perpendicular to the plane of the ring increases the frequency off set whereas rotation in an opposite sense reduces the frequency off set.

A small portion of each of the counter rotating beams leaves the closed optical path through a partially transmitting mirror at one of the corners. The extracted light beams are made collinear and directed on a photodetector to produce an output signal or beat note. By subtracting the known fixed off set from the observed frequency of the beat note, both the magnitude and the sense of the direction of rotation about an axis perpendicular to the plane of the lasing ring can be ascertained.

A feature of the method by which frequency off set is produced is that each of the counter rotating linearly polarized beams is supported by an independent atomic source of energy resulting from the energy level splitting of the excited lasing medium by the applied axial magnetic field. Thus, the frequency pulling effect of one beam on the other is avoided and the two beams are made to oscillate at different frequencies to produce a finite beat note even in the event of slow ring laser rotation.

For a more complete understanding of the present invention reference should be had to the following specification and to the sole figure which is a perspective view of a preferred embodiment.

The ring laser of the present invention comprises a gas laser tube 1 which is supported so that the longitudinal axis of the gas tube is parallel to the plane of rotatable member 2. In a typical instance, tube 1 is filled with a helium-neon gas mixture and is equipped with a pair of antireflection coated windows 3 and 4. Tube 1 is made to fluoresce by the application of a high frequency excitation potential derived from source 5. The excitation signal is applied by cable 6 to matching network 7. Matching network 7 is connected to electrode pair 8 and 9. Equivalent direct current excitation of the gas tube also is possible.

A steady magnetic field of predetermined value is produced by hollow cylindrical permanent magnet 10 and is directed axially along tube 1. In the presence of the applied magnetic field, the energy levels of the laser medium are split into corresponding pairs of adjacent energy levels in accordance with the well-known Zeeman effect. Said effect is discussed in the paper entitled "Zeeman Effects in Gaseous He-Ne Optical Masers" by R. Paananen et al. in the January 1963 Proceedings of the IEEE, beginning on page 63. As discussed in the cited paper, a weakly excited laser medium produces a pair of oppositely sensed circularly polarized waves of different frequency in the presence of the axial magnetic field. It is preferred that the laser excitation be weak in order that the generation of additional oscillatory modes be avoided. Under the condition of weak excitation of tube 1, two oppositely sensed circularly polarized waves issue from each of windows 3 and 4.

It is desired that one of the circularly polarized waves be permitted to propagate around a closed loop optical path in one direction only whereas the other circularly polarized wave be permitted to propagate exclusively in the other direction around the same path. In the case of the preferred embodiment, the closed loop optical path is a plane rectangle formed by corner reflecting mirrors 11, 12, 13 and 14. In order to minimize the loss of light, it is preferred that the travelling beam be linearly polarized. These criteria are realized through the use of quarter wave optical plates 15 and 16 and Brewster window polarizers 17 and 18. Other conventional polarizing means such as, for example, anti-reflection coated Nicol prisms may be substituted for Brewster window polarizers 17 and 18.

The oppositely sensed circularly polarized beams passing through window 4 of tube 1 are converted by plate 16 into first and second linearly-polarized beams at right angles to each other. Plate 16 is oriented so that the first beam which is selected to propagate in a counterclockwise direction around the path is polarized perpendicularly to table 2. Brewster window polarizer 18 is inclined at Brewster's angle relative to the longitudinal axis of tube 1 and the polarization of the aforesaid first beam lies within the plane of incidence of the Brewster polarizer. Under these conditions, the first beam passes through polarizer 18 with substantially no reflection. On the other hand, the second linearly polarized beam at the output of plate 16 is polarized perpendicularly to the plane of incidence of polarizer 18 and is reflected to a significant extent. Thus, the first linearly polarized beam impinges upon the corner reflector 14 with appreciably higher intensity than does the second linearly polarized beam. Mirror 14, which may consist of multiple dielectric layers, is oriented so that the first beam is polarized perpendicularly to the plane of incidence. Mirror tilt control knobs 19 and 20 are provided to facilitate the proper positioning of the mirror.

The first beam is reflected by mirror 14 and continues to travel counterclockwise around the closed loop optical path without any change of direction of polarization upon reflection by each of the additional corner reflectors 13, 12 and 11. The first beam finally completes a traversal of the optical path on passing through Brewster angle polarizer 17 and quarter wave plate 15 wherein it is reconverted to circularly polarize energy in its original sense. No reflection is suffered at polarizer 17. On the other hand, any energy polarized in the direction of the second counterclockwise propagating beam is partially reflected by polarizer 17. Therefore, it can be seen that the first linearly polarized beam passes with minimum loss counterclockwise around the closed loop optical path whereas the second linearly polarized path is attenuated by undergoing partial reflection in polarizers 18 and 17.

It will be observed that the oppositely sensed circularly polarized beams issuing from window 3 of tube 1 and travelling in a clockwise direction around the loop experiences effects fully equivalent to those just described in connection with the counterclockwise travelling means. That is, the beam whose direction of polarization is perpendicular to table 2 propagates clockwise around the loop without reflection loss. The other clockwise propagating beam which is polarized parallel to the table suffers partial reflection. By limiting the excitation applied to the gas tube, only the counterclockwse travelling beam and the clockwise travelilng beam which are polarized perpendicular to the table 2 are sustained by laser action whereas the other two beams (both of which are polarized parallel to the table) are attenuated and eliminated. The sustained counter-rotating beams are derived from respective ones of the oppositely sensed circularly polarized beams generated within tube 1 in the presence of the axial magnetic field provided by magnet 10. Moreover, said oppositely sensed circularly polarized beams are at different frequencies related to the energy level doublet caused by the Zeeman splitting of an energy level of the excited laser medium. Thus the two linearly polarized waves which propagate in respective directions about the closed optical path derive excitation from the different atoms associated with the split energy levels. The two modes are substantially independent of each other with regard to the atomic origin of their sources of dipole radiation. Accordingly, the mode pulling effects of one beam on the other is avoided and the counter rotating beams oscillate at respective frequencies which vary solely in accordance with the rotation of the ring laser about an axis perpendicular to the plane of the ring. Ring laser rotation in one sense about the aforesaid axis increases the difference in frequency caused by the Zeeman effect between the two counter-rotating beams whereas rotation in an opposite sense reduces the frequency difference.

Power from the two counter-rotating travelling waves is brought out from the closed loop path through corner mirror 14 which partially transmits the light impinging upon it. The beam propagating in the closed loop path clockwise around the ring is partially transmitted through mirror 14, reflected by mirror 21 and is partially transmitted by mirror 22 along the axis 23. The counter-rotating circulatory beam is partially transmitted by mirror 14, reflected by mirrors 24 and 22 and directed along axis 23. The two beams travelling along axis 23 impinge upon photodetector 25 which produces an output electrical signal in a conventional manner having a frequency equal to the difference in frequency between the two incident light beams.

The frequency of the beat note produced by photodetector 25 is determined by the rotational rate of the ring laser about an axis perpendicular to the plane of the ring and the known frequency off set between the counter-rotating beams due to the Zeeman splitting effect. By subtracting the known frequency difference due to the Zeeman effect from the frequency of the beat note provided by photodetector 25, both the magnitude and the sense of ring laser rotation can be ascertained.

It should be observed that ring laser sensitivity to rotation is enhanced by ring shapes which maximize the ratio between the area enclosed and the perimeter of the ring. Accordingly, a square is preferred if a four-sided "ring" is chosen. The rectangular shape depicted in the drawing for the closed loop optical path is not a square in order that the entire laser apparatus could be represented conveniently on one sheet of drawings.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A ring laser rotation rate sensor having a plane polygonal closed loop optical path, said laser comprising
    a reflecting mirror in said path at each corner of said path,
    a longitudinally extensive lasing medium in said path, the longitudinal axis of said medium being coincident with a side of said path,
    means for applying a predetermined magnetic field longitudinally along said medium,
    means for exciting said medium to generate a pair of oppositely sensed circularly polarized beams of different frequencies in both directions along said path,
    means favoring the propagation of one of said beams in one direction about said path and for favoring the propagation of the other of said beams in the opposite direction about said path,
    one of said mirrors partially transmitting the counter rotating light beams impinging thereon,
    means for making collinear the beams transmitted through said one of said mirrors,
    and means for heterodyning the collimated beams.

2. A ring laser rotation rate sensor having a plane rectangular closed loop optical path, said laser comprising
    a reflecting mirror in said path at each corner of said path,
    a longitudinally extensive lasing medium in said path, the longitudinal axis of said medium being coincident with a side of said path,
    permanent magnet means for applying a predetermined magnetic field longitudinally along said medium,
    means for exciting said medium to generate a pair of oppositely sensed circularly polarized beams of different frequencies in both directions along said path,
    means favoring the propagation of one of said beams in one direction about said path and for favoring the propagation of the other of said beams in the opposite direction about said path,
    one of said mirrors partially transmitting the counter rotating light beams impinging thereon,
    means for making collinear the beams transmitted through said one of said mirrors,
    and means for heterodyning the collimated beams.

3. A ring laser as defined in claim 2 wherein said lasing medium comprises a mixture of helium and neon gases contained within a longitudinally extensive tube.

4. A ring laser as defined in claim 2 wherein said means favoring the propagation of one of said beams in one direction about said path and favoring the propagation of the other of said beams in the opposite direction about said path comprises
    a pair of quarter wave plates positioned on opposite ends of said lasing medium along the longitudinal axis thereof,
    and a pair of Brewster angle polarizers positioned adjacent respective ones of said plates and along said longitudinal axis.

5. A ring laser rotation rate sensor having a plane rectangular closed loop optical path, said laser comprising
    a reflecting mirror in said path at each corner of said path,
    a longitudinally extensive gas tube in said path, the longitudinal axis of said tube being coincident with a side of said path,
    means for applying a predetermined magnetic field longitudinally along said tube,
    means for exciting the gas within said tube to generate a pair of oppositely sensed circularly polarized beams of different frequencies in both directions along said path,
    a pair of quarter wave plates positioned on opposite ends of said tube along the longitudinal axis thereof,
    a pair of Brewster angle polarizers positioned adjacent respective ones of said plates and along said longitudinal axis,
    one of said mirrors partially transmitting the counter rotating light beams impinging thereon,
    means for making collinear the beams transmitted through said one of said mirrors,
    and means for heterodyning the collimated beams.

6. A ring laser as defined in claim 5 wherein said gas tube is filled with a mixture of helium and neon gases.

7. A ring laser rotation rate sensor having a plane polygonal closed loop optical path, said laser comprising
    a reflecting mirror in said path at each corner of said path,
    a longitudinally extensive lasing medium in said path, the longitudinal axis of said medium coincident with a side of said path,
    means for applying a predetermined magnetic field longitudinally along said medium,
    means for exciting said medium to generate a pair of oppositely sensed circularly polarized beams of different frequencies in both directions along said path,
    means adjacent each end of said medium for converting said oppositely sensed circularly polarized beams into a pair of linearly polarized beams polarized perpendicularly to each other,
    first means adjacent one of said converting means for favoring the propagation of one of said linearly polarized beams,
    second means adjacent the other of said converting means for favoring the propagation of one of said linearly polarized beams polarized in the same direction as said one of said linearly polarized beams favored by said first means,
    one of said mirrors partially transmitting the light beam impinging thereon,
    means for making collinear the beams transmitted through said one of said mirrors,
    and means for heterodyning the collimated beams.

8. A ring laser rotation rate sensor as defined in claim 7 and further including means for positioning each said mirror so that the plane of the favored linearly polarized beams is perpendicular to the plane of incidence.

No references cited.

JEWELL H. PEDERSEN, *Primary Examiner.*

B. J. LACOMIS, *Assistant Examiner.*